United States Patent [19]

Licht

[11] 4,116,503
[45] Sep. 26, 1978

[54] RESILIENT FOIL THRUST BEARINGS

[75] Inventor: Lazar Licht, San Mateo, Calif.

[73] Assignee: United Technologies Corporation, Hartford, Conn.

[21] Appl. No.: 805,760

[22] Filed: Jun. 13, 1977

[51] Int. Cl.² ............................................. F16C 17/08
[52] U.S. Cl. ......................................... 308/9; 308/160
[58] Field of Search ..................... 308/9, DIG. 1, 135, 308/139, 121, 140, 160, 163, 164, 158, 168, 170, 172

[56] References Cited

U.S. PATENT DOCUMENTS

| 3,635,534 | 10/1972 | Barnett | 308/160 |
| 3,809,443 | 5/1974 | Cherubim | 308/9 |
| 3,893,733 | 7/1975 | Silver et al. | 308/9 |

Primary Examiner—Trygve M. Blix
Assistant Examiner—Charles E. Frankfort
Attorney, Agent, or Firm—John D. Del Ponti

[57] ABSTRACT

A fluid-film thrust bearing wherein a resilient bearing insert assembly is disposed between a rotatable thrust runner and a stationary base member. The insert assembly may comprise (1) a compliant foil-like membrane having non-radial groove geometry for generating fluid pressure and (2) resilient support means mounting the membrane on the base member, the resilient support means including an array of spring elements spaced from the membrane and having a stiffness distribution matched to the pressure distribution.

15 Claims, 9 Drawing Figures

RESILIENT FOIL THRUST BEARINGS

The Government has rights in this invention pursuant to Contract Number N00014-76-C-0191 awarded by the Department of the Navy.

BACKGROUND OF THE INVENTION

1. Field of the Invention

This invention relates to fluid-film bearings for rotating machinery and more particularly to thrust bearings which include unique resilient load-supporting bearing-insert assemblies.

2. Description of the Prior Art

Hydrodynamic thrust bearings are well known in the art and have been used effectively as supports for rotating machinery, including high-speed applications. The term hydrodynamic thrust bearing, as used herein, is meant to describe that class of fluid-film thrust bearings which has its surfaces separated by a thin layer of either liquid or gas, the film being established and the pressure generated therein by the relative motion between the bearing surfaces. This, of course, is distinct from bearings of the hydrostatic type, which require feed of pressurized fluid from an external source.

In the main, past hydrodynamic thrust bearings have usually been rigid and rigidly mounted and thus not self-aligning, unless provided with complex, expensive and frequently troublesome gimbal and pivot supports. Typical examples are the tapered-land, the Rayleigh step and pocket bearings, and the non-radially grooved (e.g., spiral or herringbone) pumping plates, the latter having particularly efficient load-generating ability. For further discussion, see D. D. Fuller, "A Review of the State-of-the-Art for the Design of Self-Acting Gas-Lubricated Bearings," *Journal of Lubrication Technology, Trans. ASME*, Vol. 91, Ser. F, No. 1, Janary 1969, pp. 1–16. These bearings have been prone to damage and destruction caused by excursions and contact by the runner due to unavoidable misalignment, whether due to manufacture and assembly, thermal distortion, or nutation (wobble) of the runner caused by unbalance. This is particularly true when excursions are large, as in the resonant speed-range. Although gimbals may be used for mounting stator plates to provide static alignment, they are relatively massive and prevent effective tracking of the runner at medium and high speeds. Furthermore, the increased degrees of freedom provided by gimbals introduce additional and dangerous resonances. Moreover, gimbal systems are frequently the cause of instability and ensuing destruction of both rotor and bearings. Similar deficiencies apply to bearings of the pivoted-shoe type which, although self-aligning, are generally complex, expensive, prone to pivot fretting and surface damage, and subject to dynamic problems, especially if gas-lubricated and operated at high speed. Overall, it is recognized that prior-art rigid and rigidly mounted, hydrodynamic thrust bearings have been frequently subject to destruction and degradation due to dynamic problems and surface deterioration, and that their operation at small clearances and high speeds has been particularly dangerous, with contact between surfaces of the thrust bearing and entry of particles posing the risk of severe damage or destruction.

Recent efforts to improve hydrodynamic bearings have resulted in compliant hydrodynamic thrust bearings equipped with foil-insert assemblies designed to generate lubricating films and to support loads. Some, such as those shown in U.S. Pat. Nos. 3,375,046; 3,382,014 and 3,635,534, may employ a plurality of bearing foils and some, such as those shown in U.S. Pat. Nos. 3,747,997 and 3,809,443, may use a unitary bearing foil. All, however, rely on the relatively uncontrolled formation of a lubricating wedge, the shape of the lubricating wedge being critical in efficient generation of load capacity. Unfortunately, in prior and current art, this shape is more a matter of chance than of design.

In sum, although the prior art techniques may be useful, the need for further improvements has remained. Unquestionably, there is a need for a fluid-film thrust bearing for the support of high speed rotors (such as turbocompressors, turbochargers, turbogenerators, turbine gas generators, cryogenic expanders, blowers, pumps, aircraft air-cycle machines, centrifuges, scanners, yarn spinners and processors and the like) which can accomplish all of the following:

1. follow both the wobble and axial motion of the runner in the entire operating range of the machine, and particularly at high speeds;
2. accommodate initial misalignment of assembly and also misalignment due to thermal distortion of rotating and stationary machine elements;
3. tolerate foreign particles in the bearing clearance through local surface-deflection;
4. provide superior wipe-wear characteristics not only at high speeds, but also when starting and stopping; and
5. compensate, at least partially, for thermal distortion (crowning).

SUMMARY OF THE INVENTION

It is the general object of the present invention to provide an improved fluid-film and resilient thrust bearing, which can remedy the deficiencies of the prior art and meet all of the foregoing needs. It is a more specific object of the present invention to provide a hydrodynamic thrust bearing, which combines the unique advantages of compliance of both bearing-surface and support with the highly efficient load generating-ability of the non-radial (spiral and herringbone) groove geometry.

It is another object of the invention to provide a hydrodynamic thrust bearing, wherein the shape of the bearing clearance closely approximates that of an optimal rigid-bearing configuration, and more particularly, one which includes a resilient bearing insert assembly having a planar foil-like membrane, which remains sensibly parallel to the thrust runner, thus approximating the optimal characteristics of a rigid bearing, while retaining the advantages of surface and support flexibility.

In accordance with one aspect of the present invention, a novel and improved thrust bearing insert assembly includes a compliant foil-like membrane, which is maintained on a base member parallel to the surface of a rotating thrust runner by resilient support-means having a stiffness matched to the pressure distribution of the generated fluid film. The resilient support-means for the flexible foil-like membrane may include a plurality of concentric, coplanar rings and an array of spring elements to control the clearance and pressure-load in a thrust bearing equipped with non-radial pumping grooves, located in either the stationary (flexible), or in the rotating (rigid) surface.

In the preferred embodiment, the resilient support-means for the foil-like membrane is in the form of a foil-like spider-spring which comprises a plurality of concentric rings, integral with and secured together by an array of radial spring elements of predetermined stiffness which are spaced from the membrane. In order to properly carry the spider-spring, the base member is provided with a plurality of concentric ridges engaging the spring elements at their midpoints.

In an alternate embodiment the base member is provided with a plurality of openings, configured in a plurality of concentric circular arrays, and the resilient support-means comprises a plurality of spring elements in the form of plate springs, each disposed over one of the openings, a plurality of intermediate elements, each supported on one of the plate springs and a plurality of discrete concentric rings, supported by the intermediate elements and in turn supporting the flexible, non-radially grooved bearing membrane.

BRIEF DESCRIPTION OF THE DRAWINGS

An understanding of the invention will become more apparent to those skilled in the art by reference to the following detailed description when viewed in light of the accompanying drawings wherein.

DESCRIPTION OF THE PREFERRED EMBODIMENTS

Figure 1:
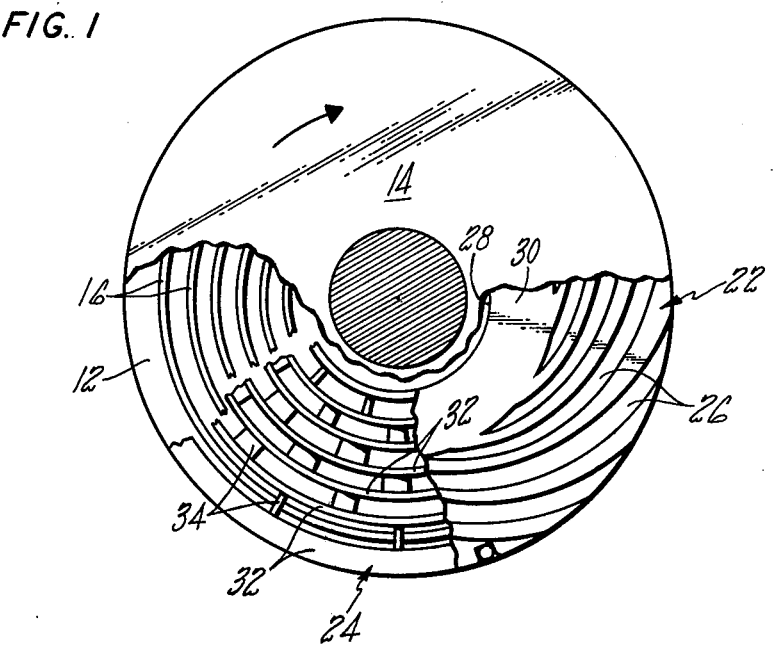
FIG. 1 is a plan view of an axial thrust bearing incorporating the present invention with some portions thereof broken away.
Figure 2:
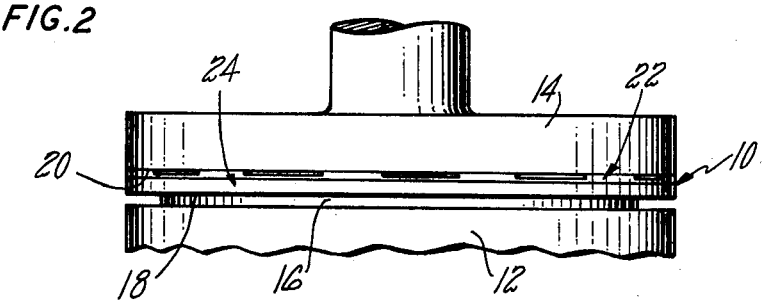
FIG. 2 is an elevation of the bearing of FIG. 1.

Referring now to the drawings, wherein like numerals indicate like parts, the bearing insert assembly 10 is shown as being positioned between a stationary supporting member or base 12 and a rotatable thrust runner 14. The supporting member 12 has ridges 16, the crests of which lie on a plane surface 18 spaced opposite the parallel bearing surface 20 of the runner 14. As will be described in more detail below, the insert assembly 10 is mounted on the base member 12 and is thus stationary with respect to the runner 14.

The bearing assembly 10 comprises a foil-like membrane in the form of a disk 22 and a supporting spider-spring 24. The foil disk 22 is a thin, circular, foil-like sheet of metal or other suitable material, which is compliant, i.e., whose thickness relative to its lateral dimensions is sufficiently small to offer little resistance to bending and to local deflection. As shown, the disk 22 is provided with spiral grooves 26 in its upper surface, preferably logarithmic spirals, to effect viscous pumping of fluid between the disk 22 and the runner 14 and to generate a pressure rise in the radial direction. The foil may typically be 0.004 to 0.008 in. (0.1 to 0.2 mm) thick with grooves of a depth typically of the order of 0.0015 in. (0.038 mm), or three times that of a representative bearing clearance of 0.0005 in. (0.013 mm). Instead of being provided in the bearing surface of the disk 22, the grooves could, of course, be provided in the bearing surface 20 of the runner. The grooves 26 extend from the outer edge of the foil-disk 22 inwardly toward, but short of the central opening 28, to define a sealing annulus 30. As will be appreciated by those skilled in the art, the spiral-groove thrust-bearing disk 22 is inwardly pumping. It should be noted, however, that other non-radially grooved disks or runners, which develop a primarily radial pressure rise, may be utilized, such as herringbone-groove, or outwardly pumping spiral-groove disks.

Figure 3:
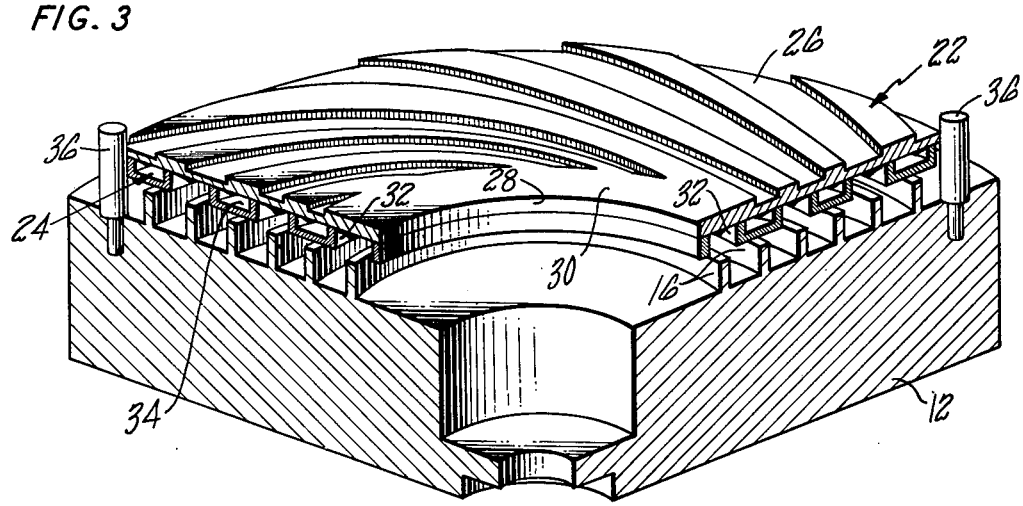
FIG. 3 is a perspective view of a section of the thrust bearing shown in FIGS. 1 and 2.
Figure 4:
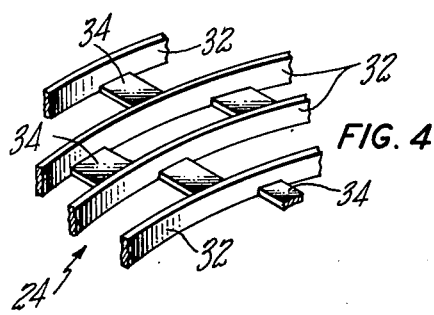
FIG. 4 is an enlarged perspective detailed view illustrating the spring plate of the thrust bearing of FIGS. 1-3.

Pursuant to the present invention, the foil-disk 22 is resiliently supported by means having a stiffness distribution matched to the pressure distribution of the generated fluid film. As shown in FIG. 3, resilient support may be provided by a foil-like spring in the form of a reticulated spider member 24, in particular association with rigid, narrow and concentric supporting ridges 16, which are integral with the base plate 12 and have crests coplanar with and defining the surface 18. The spider-spring 24 comprises a plurality of concentric coplanar rings 32 each connected together by a plurality of recessed, radial spring-elements 34. As best seen in FIG. 4, the concentric arrays of elements 34 attaching adjacent pairs of rings 32 are sized to be of differing widths so as to provide varying stiffness. The spider-spring 24 is itself supported on the member 12 via the rigid ridges 16, each of which engages one circular array of the elements 34. Both the spider-spring 24 and the foil disk 22 are slotted at their outer edge to engage anti-rotation pins 36 extending outwardly from the base member 12. The spider-spring may typically be of the same overall thickness as the foil-disk 22, i.e., approximately 0.008 in. (0.2 mm), with spring elements approximately 0.002–0.003 in. (0.05 to 0.075 mm) thick.

Figure 8:
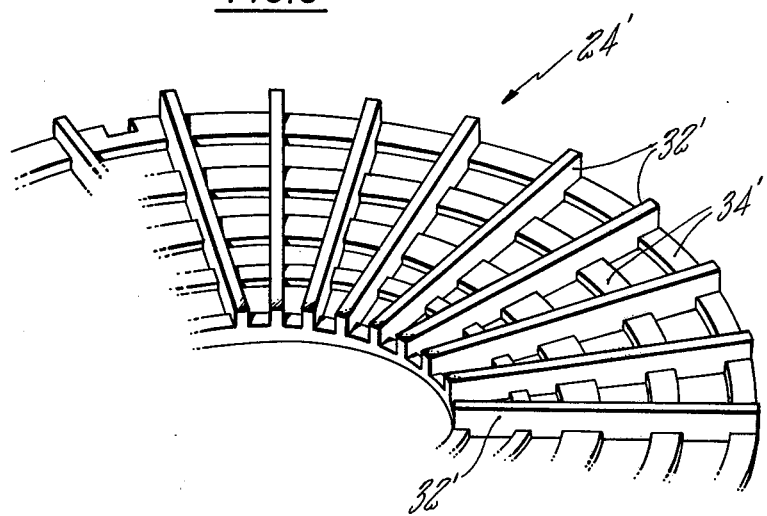
FIG. 8 is a perspective view illustrating an alternate embodiment of a spring plate.
Figure 9:
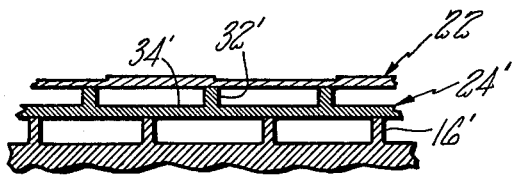
FIG. 9 is a circumferential section of a bearing incorporating the spring plate of FIG. 8, with some portions thereof broken away.

It will be noted that local stiffness may be determined not only by varying the width of the elements 34, but also in other ways, such as for example by varying their thickness or simultaneously their thickness, length and width. The supporting rings 32 may instead be interconnected by perforated strips with the solid areas between perforations acting as the spring elements. Other spider-type arrangements may suggest themselves to those skilled in the art, such as a spring plate 24' shown in FIGS. 8 and 9 in which the concentric support rings 32 are replaced by radial support-spokes 32' and the radial, recessed spring-elements 34 are replaced by circumferential elements 34' joining the spokes. In such case, the circumferential ridges 16 on the base member 12 would be replaced by radial ridges 16' to support the circumferential spring-elements 34' at their midpoints. The supporting rings (or spokes) may, of course, be integral with the foil-disk and formed on the underside thereof in which case the spider-spring would be a member of uniform thickness.

The spider-spring is preferably made of a metal which has suitable elastic properties and strength, such as stainless spring-steel or copper-beryllium, by means such as etching, spark erosion or laser, ultrasonic, or electron-beam machining.

Figure 5:
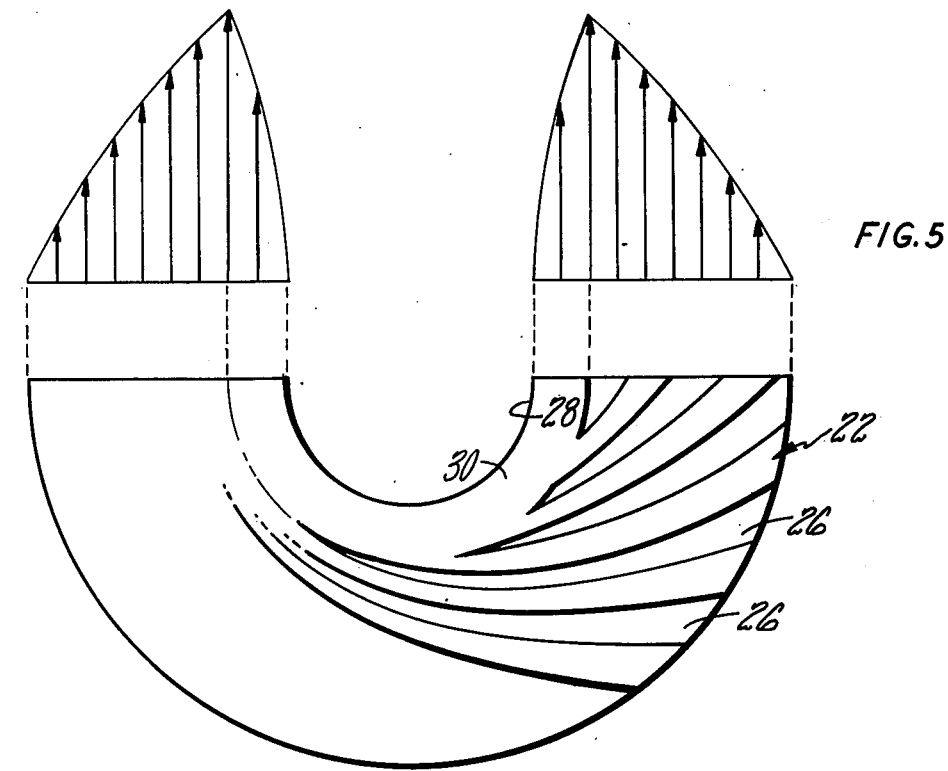
FIG. 5 is a graphical illustration of a pressure profile along a diameter of a grooved bearing.

Having observed the details of the illustrative embodiment shown in FIGS. 1-4, attention may now be directed to the operation of the thrust bearing, for which the mean pressure profile along any diameter is represented schematically in FIG. 5. In the operation of the spirally grooved bearing of the inward pumping type described above, and as indicated hereinbefore, the pressure rises radially, from ambient at the external perimeter of the foil 22, to a maximum at the inner boundary of the grooves 26. From this maximum value, the pressure falls again over the sealing annulus 30, reaching the ambient pressure-level at the inner perimeter of the foil. With the radially non-uniform, average pressure distribution, the separate rings 32, which support the foil-disk 22, carry unequal parts of the load. In order to maintain the foil-disk 22 in a flat, planar condition, so that it remains parallel to the surface 20 of the runner 14, the radial elements 34 of the spider-spring 24 are sized and arranged in circular arrays so as to deflect equally about the concentric ridges 16 located on the base 12, each according to its stiffness and load. As shown, in order to insure essentially parallel deflection of the grooved foil-disk 22, the radial elements are varied in width from one concentric array to the next in proportion to the local pressure level created by the viscous pumping. This creates conditions which approximate those prevailing in an idealized, rigid-surface, parallel-surface thrust bearing. At the same time, because of the resilience, flexibility and compliance of the foil-disk 22 and of the supporting spring 24, along with the negligibly small mass and inertia of the entire foil-insert assembly, the disk 22 will closely track the runner surface 20 and remain sensibly parallel to it, thus reducing greatly the danger of contact and alleviating through elasticity the severity of occasional impact.

Figure 6:
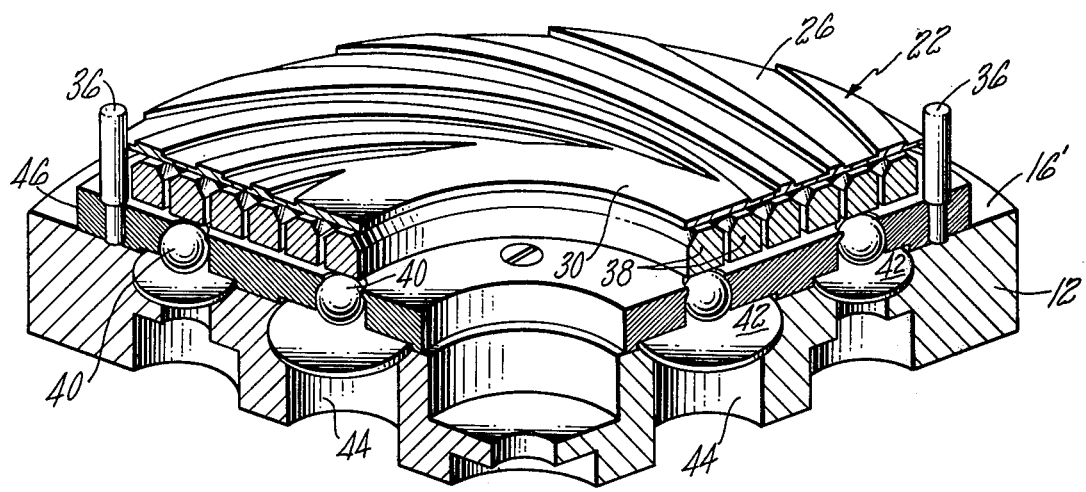
FIG. 6 is a perspective view of a section of an alternate embodiment of the present invention.
Figure 7:
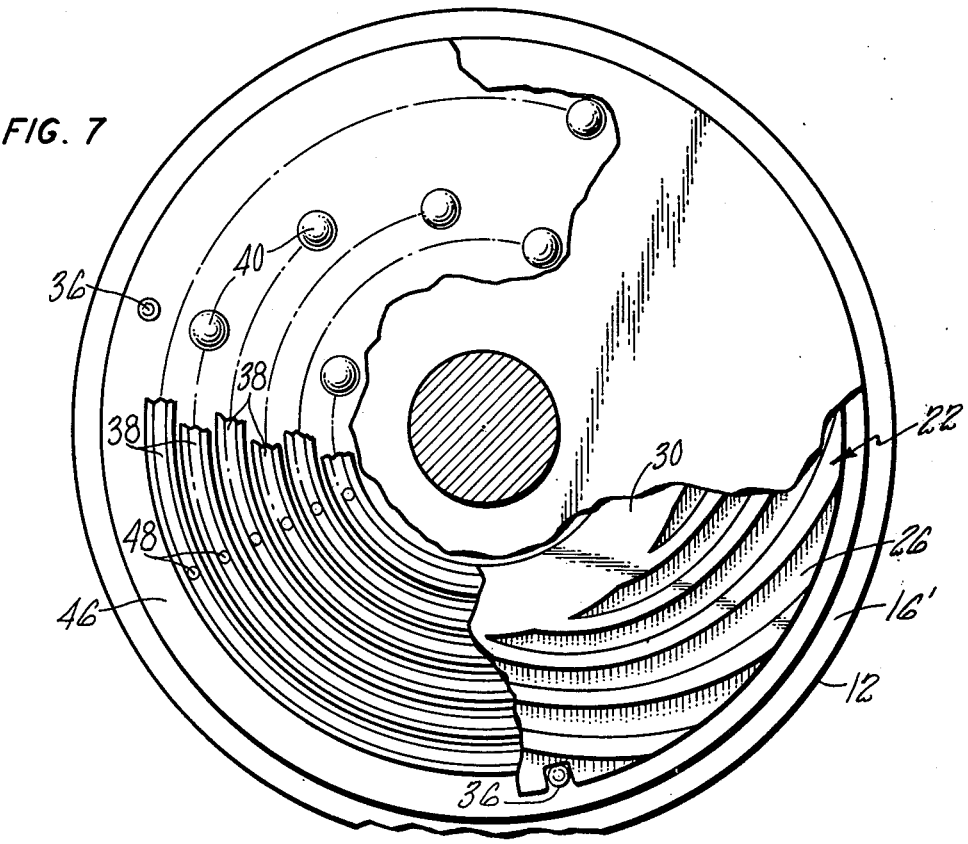
FIG. 7 is a plan view of the bearing of FIG. 6 with some portions thereof broken away.

In a modification of the preferred embodiment and as shown in FIGS. 6 and 7, the resilient bearing-insert assembly may comprise a single foil-disk 22, having grooves 26 and sealing annulus 30, but instead of an integral spider-spring 24, there is provided resilient support means, which include a plurality of rings 38, intermediate elements 40 and spring elements 42. As shown, the supporting rings 38 are concentric with each other and with foil-disk 22, are unconnected to each other and are separately supported on a plurality of intermediate elements 40 (e.g., each on three balls of equal size) so that their upper surfaces are co-planar. The balls 40 are themselves each supported on a spring element (plate spring 42) in the shape of a thin flat disk, each plate spring 42 overlying an opening 44 in the lapped surface 16' of the base 12. The edge of each opening provides simple support for the thin plate spring 42. Since the stiffness of the plate spring varies inversely with the radius squared, the radius of each opening 44 is selected to give equal deflections of all plate springs at the portion of the load carried by each ring 38. Thus the plate springs supporting the innermost and outermost rings (annuli of lowest pressure) overly the largest openings in the baseplate, while those adjacent to the boundary between the grooved portion of the foil-disk and the sealing land 30 (annuli of highest pressure) overly the smallest openings. In this manner, the local reactions, which equal the integrals of pressure of adjacent bearing annuli, produce equal deflections of all plate springs, so that a parallel clearance can be approximated. In other words, the size of the openings 44 and the thickness of the spring elements 42 are designed to provide a stiffness distribution which matches the pressure distribution of the generated air film.

As will be appreciated, similar results will obtain, if instead of a plurality of separate plate springs 42, a single sheet overlying the entire base member and its plurality of openings 44 is utilized. In such case, the spring elements 42 would be in the form of those portions of the sheet which overly the openings 44.

A cage 46 is provided to hold the balls 40 and plate springs 42 in position, while dowel pins locate the cage 46 concentrically on the base plate 12. Each ring 38 is preferably provided with a pair of small bores to fit over vertical pins 48 furnished on the upper surface of the cage 46, to not only provide loose location of the rings, but also to prevent gross lateral movement thereof, without interfering with small axial displacements and rotations of the rings about any bearing diameter. A plurality of anti-rotation pins 36, extending upwardly from the cage 46, engage slots in the outer perimeter of the foil-disk 22 to prevent its rotation.

Those skilled in the art will appreciate further modifications of the embodiment shown in FIG. 6, which may be made without departing from the inventive concept advanced herein. Instead of utilizing plate springs 42 in combination with balls 40 and cage 46, the rings 38 may be supported on arrays of various elastic elements, such as spiral, bellow or Belleville-type springs.

In one series of tests, thrust bearings as shown in FIGS. 1–7 and having a bearing OD of 3.15 inches (8.0 cm) and a bearing ID of 1.26 inches (3.2 cm) successfully supported a thrust load of the order of 29 lb. (13 Kg.f.) at 45,000 rpm at a means clearance ($h_o$) of approximately 0.0007 in. (18 $\mu$m) with asymmetric unbalance of the rotor of magnitude $u = 1260$ $\mu$in.-oz./per 1 lb. of rotor weight (0.2 cm - gm/per 1 Kg.f. of rotor weight). The bearings performed extremely well and wear effects were minor.

By way of summary, the present invention provides an improved fluid-film resilient thrust bearing with many advantages. Some are:

(a) An ability to follow both wobble and axial movements of the runner at high speeds, due to flexibility, resilience and relatively small mass of the elastic foil-bearing elements.

(b) An ability, due to compliance, to accommodate both initial misalignment of assembly and also misalignment due to thermal distortion of rotating and stationary members.

(c) Frictional damping due to small relative motion between foil disk and resilient support means aids in suppressing vibrations, rather than inducing vibrations of the type associated with other self-aligning thrust bearings.

(d) Elimination of need for massive and frequently destabilizing gimbals, or of complex and expensive pivoted-shoe systems, which in the absence of additional damping, are associated frequently with dangerously high resonant amplitudes of motion.

(e) Tolerance of foreign particles in the bearing clearance and adaptability to operation with contaminated, particle-laden fluids. The foil disk is not only deflectable as a whole, but also locally, and hence the ability to operate at small clearances, even when deflections exceed the clearance by an order of magnitude. This is particularly important with heavily loaded, high speed gas bearings.

(f) Superior wipe-wear characteristics at high speeds, starting and stopping. Because of surface compliance, contact and associated dissipation of energy are distributed over a much larger area, rather than concentrated, as in rigid bearings. Moreover, contact is largely elastic rather than deforming-dissipative.

(g) The effect of thermal distortion, known as crowning which causes a departure from parallelism of the bearing surfaces and a concomitant pressure drop, is at least partially compensated by the restoring effect of the compressed spring elements.

(h) The small number of elements which are both relatively inexpensive and easy to replace and maintain.

What has been set forth above is intended primarily as exemplary to enable those skilled in the art in the practice of the invention and it should therefore be understood that, within the scope of the appended claims, the invention may be practiced in other ways than as specifically described.

I claim:

1. In a non-radially grooved thrust bearing wherein a fluid film is induced between bearing surfaces provided on a rotating thrust runner and a stationary base member, the improvement which comprises a resilient bearing insert assembly mounted on said base member, said assembly comprising a compliant foil-like membrane having as a surface one of said bearing surfaces, a plurality of concentric coplanar rings supporting said foil-like membrane and means including a plurality of spring elements spaced from said foil-like membrane resiliently mounting said rings on said base member to ensure desired clearance and loading in said thrust bearing.

2. The invention of claim 1 wherein said rings are separated by a plurality of said spring elements of predetermined stiffnesses secured to and integral with said rings and said means including a plurality of concentric ridges on said base member engaging said spring elements.

3. The invention of claim 2 wherein said spring elements are radially disposed with respect to said rings with each of said spring elements having opposite ends secured to adjacent rings.

4. The invention of claim 1 wherein said spring elements are of predetermined stiffnesses and are disposed between said rings and said base member.

5. The invention of claim 4 wherein said base member has a plurality of openings in one surface thereof, each of said spring elements being disposed over one of said openings.

6. The invention of claim 5 wherein said means further includes a plurality of intermediate elements disposed between said rings and said spring elements, each of said intermediate elements being supported on one of said spring elements.

7. The invention of claim 6 wherein said openings are of equal diameter and said spring elements comprise plate springs of equal thickness.

8. The invention of claim 6 wherein said openings vary in diameter and said spring elements comprise plate springs of varying thickness.

9. The invention of claim 7 wherein each of said intermediate elements comprises a ball.

10. The invention of claim 9 wherein said balls are of equal diameter and each of said rings is supported on three of said balls.

11. In a hydrodynamic thrust bearing wherein a fluid film of predetermined thickness and pressure distribution is generated between bearing surfaces provided on a rotating thrust runner and a stationary base member, the improvement which comprises a resilient bearing insert assembly mounted on said base member, said assembly comprising a compliant foil-like membrane having as a surface one of said bearing surfaces and an integral reticulated foil-like spider member resiliently mounting said foil-like membrane on said base member, said spider member comprising a plurality of support members and an array of spring elements connecting said support members and being spaced from said membrane, said array of spring elements having a stiffness distribution matched to said pressure distribution to ensure desired clearance and loading in said thrust bearing.

12. The invention of claim 11 wherein said support members comprise a plurality of concentric coplanar rings supporting said foil-like membrane and said spring elements having opposite ends secured to adjacent of said rings, said spring elements being radially disposed with respect to said rings, and means on said base member engaging said spring elements.

13. The invention of claim 12 wherein said means comprises a plurality of concentric ridges.

14. The invention of claim 11 wherein said support members comprise a plurality of radially disposed coplanar spokes supporting said foil-like membrane and said spring elements having opposite ends secured to adjacent of said spokes, said spring elements being circumferentially disposed with respect to said spokes, and means on said base member engaging said spring elements.

15. The invention of claim 14 wherein said means comprises a plurality of radially disposed ridges.

* * * * *